Aug. 26, 1958    F. HOPKINS    2,848,932
ROTARY HOE WHEEL
Filed Oct. 3, 1955

INVENTOR.
FRANK HOPKINS
BY *James E. Nilles*
& *Irvin L. Groh*
ATTORNEYS.

2,848,932
ROTARY HOE WHEEL

Frank Hopkins, Highland Park, Mich., assignor to Massey-Ferguson Inc., a corporation of Maryland Application October 3, 1955, Serial No. 537,989

5 Claims. (Cl. 97—212)

This invention relates to agricultural implements and particularly to a rotary hoe wheel of the type incorporated in implements such as cultivators and tillers used in breaking up, loosening and cultivating the soil.

Rotary hoe wheels incorporate a plurality of ground-engaging teeth which are ordinarily fastened to a wheel disk or hub by such means as bolts, rivets or welds. The cost of such fastening means forms a large portion of the cost of a hoe wheel and the number of operations required to fabricate each wheel with such fasteners increases the cost of manufacture. Such costs are consequently multiplied in an implement utilizing a large number of wheels. Furthermore, rotary hoe wheels ordinarily embody a wheel part in the form of a disk, or the like, of sufficient size to afford attaching areas for the teeth. Such disks, however, act as barriers to soil movement and prevent the broken or loosened soil from sifting between the teeth for even distribution of soil around plants and between plant rows. In addition, the teeth are usually rigidly attached to the wheel part so that stones become lodged between the teeth and impair the operation of the rotary hoe.

It is a general object of the invention to provide an improved rotary hoe wheel.

It is a further object of the invention to provide an improved rotary hoe wheel incorporating a novel fastening means to retain the hoe teeth in a proper relation to the wheel.

It is another object of the invention to provide a rotary hoe wheel which uses a minimum of parts and fastening means, thereby reducing the cost of materials and manufacture.

A further object of the invention is to provide a rotary hoe wheel affording flexing of the teeth so that stones and the like will not become lodged therebetween.

It is a further object of the invention to provide a rotary hoe wheel which permits broken ground to sift through the teeth and to lodge in close proximity to the plant being cultivated, thereby affording a uniform distribution of soil around the plant and between the plant rows.

The foregoing and other objects and advantages are attained by the present invention, various novel features of which will be apparent from the following description and from the accompanying drawings disclosing a preferred embodiment of the invention.

Figure 1:
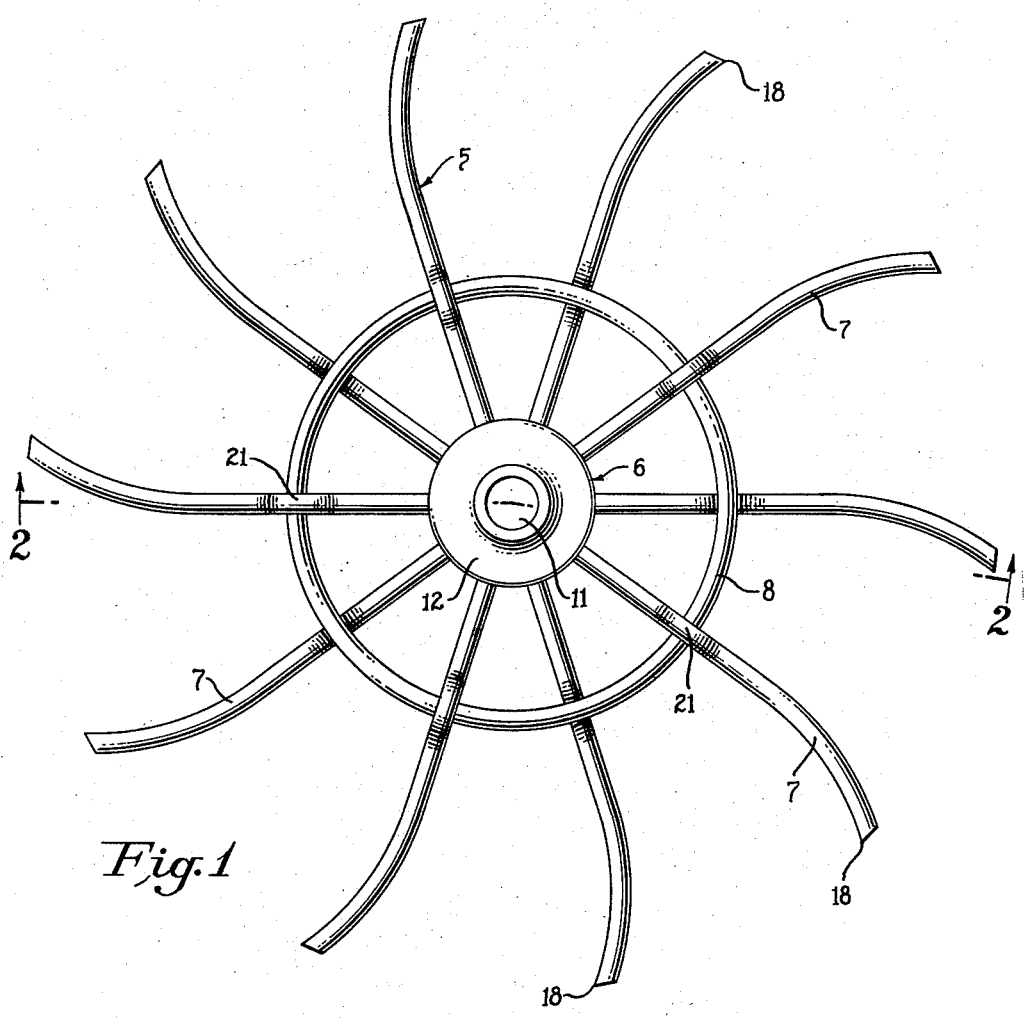
Fig. 1 is a side view of a rotary hoe wheel incorporating the invention.

Referring to the drawings, a rotary hoe wheel 5 embodying the invention includes a hub member 6, a plurality of earth-engaging teeth 7 and a ring element 8.

The hub member 6 of the rotary hoe wheel is centrally apertured as at 11 to receive an axle (not shown) which may afford a mounting for additional hoe wheels. The hub 6 is of relatively small diameter when compared with the diameter of the entire hoe wheel, and is provided with a peripheral flanged portion 12 normal to the axis of rotation of the hub. A plurality of bores 13 are formed in the flanged portion 12 to extend radially of the hub and to act as socket portions for receiving the shank ends of the teeth.

The teeth 7 are made of steel rod, which is readily available on the market, and each tooth is formed with a ground-engaging shank end 16 adapted to be received by one of the hub bores 13 and also with a ground-engaging part 17. The ends of the ground-engaging parts 17 may be formed in a number of different designs. For example, they may be pointed, they may be flattened to afford a spade type tip, or as shown in the drawings the teeth may be cut off at an angle to form soil penetrating edges 18.

Each tooth 7 is bent intermediate its ends to form a generally U-shaped portion 21 offset to one side of the tooth to afford a space between the generally longitudinally aligned shank portion 16 and ground-engaging portion 17. The offset portion 21 is bent to conform to the side surface of the ring 8 which is disposed in circumferentially spaced relation to the hub 6 and in a plane normal to the axis of rotation of the hoe wheel. The retainer ring 8 may be formed of steel rod and is positioned relative to the hub 6 so that offset portions 21 of next adjacent teeth act as lock portions to engage opposite sides of the ring.

In assembly of the wheel, the shank ends 16 of the teeth are slidably inserted in the socket portions formed by the radial bores 13 and next adjacent teeth 7 are disposed so that the offset portions 21 extend in opposite directions to each other. Thereafter a partially formed or split retainer ring 8, that is, one in which the ends of the rod forming the ring have not been joined, is woven between the teeth 7 into the spaces formed by the offset portions 21 so that the latter are disposed at opposite sides of the ring 8. After the split ring has been inserted in position the unjoined ends may be welded together to form a continuous ring. In this manner the ring 8 is disposed coaxially with the hub 6 and is disposed together with the radial bores 13 in the same plane normal to the hub axis. The teeth 7 therefore extend radially from the hub 6 so that the U-shaped portions 21 of the teeth 7 embrace opposite sides of the ring 8, and then extend radially beyond the ring to engage the ground.

Figure 2:
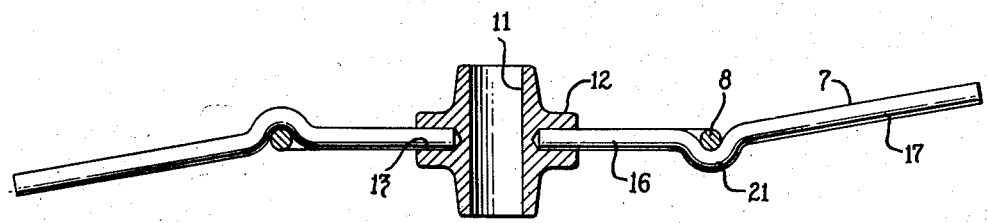
Fig. 2 is a sectional view taken on line 2—2, Fig. 1.

As best seen in Fig. 2, the ground-engaging portions 17 of the teeth 7 are bent axially of the wheel 5 so that the ground-penetrating edges 18 of next adjacent teeth are disposed at opposite sides of the wheel to increase the ground-engaging area of the latter.

During operation of the hoe wheels in the ground the retainer ring 8 coacts with the offset portions 21 of the teeth 7 to restrain radial movement of the teeth in the socket portions 13 and, at the same time, permits a limited amount of deflection of the teeth so that they may move relative to the ring in the plane of rotation of the wheel. Furthermore, the retainer ring, unlike ordinary wheel disks, affords even distribution of broken or loosened soil by permitting practically unrestricted sifting of soil between the teeth for the entire length of the latter between the hub 6 and the penetrating edges 18.

It will now be seen that there has been provided a simple and inexpensive rotary hoe wheel utilizing a minimum number of parts and fastenings, and one which permits deflection of the teeth and yet retains them in a fixed position relative to the hub.

It should be understood that it is not intended to limit the invention to the above described forms and details, and that the invention includes such other forms and modifications as are embraced by the scope of the appended claims.

Having shown and described my invention, I claim:

1. A wheel for a rotary hoe comprising, a hub member having a plurality of elongated socket portions, a plurality of teeth slidably inserted in said socket portions, respectively, and extending radially from said hub, said teeth being formed with intermediate axially offset portions, and a ring element disposed coaxially with said hub and movably engaging said opposite offset portions of adjacent teeth to restrain slidable movement of said teeth in said sockets.

2. A wheel for a rotary hoe comprising, a hub member having a plurality of elongated socket portions extending radially of the axis of rotation of said hub member in a plane normal to said axis, a plurality of teeth slidably disposed in said socket portions, respectively, and extending radially from said hub member, said teeth each presenting an intermediate, axially extending lock portion, and a ring element disposed in said plane coaxially with said hub member and movably engaging said lock portions to permit deflection of said teeth in said plane and to restrain sliding movement of said teeth in said sockets.

3. A wheel for a rotary hoe comprising, a hub member having a plurality of elongated socket portions extending radially of the axis of rotation of said hub member in the plane transverse to said axis, a plurality of teeth each comprising a shank portion and an earth-engaging portion, said shank portion being slidably disposed in said socket portions, respectively, each of said teeth presenting a portion offset to one side of said plane to afford a space between said shank portion and earth-engaging portion, said offset portions of next adjacent teeth being disposed at opposite sides of said plane, and a ring disposed in said plane and in said spaces formed between said shank and earth-engaging portions thereby preventing slidable movement of said teeth and retaining said shank portions in said socket portions.

4. A wheel for a rotary hoe comprising, a hub member having a plurality of elongated socket portions extending radially of the axis of rotation of said hub member in a plane normal to said axis, a plurality of teeth slidably disposed in said socket portions, respectively, and extending radially from said hub member, said teeth each presenting a bent portion offset to one side, said offset portions on next adjacent teeth being offset in opposite directions from said plane, a ring element disposed in said plane coaxially with said hub member and between next adjacent teeth and in engagement with said offset portions to resist sliding movement of said teeth and to permit flexing of said teeth in said plane.

5. A wheel for a rotary hoe comprising, in combination, a hub member having a plurality of circumferentially spaced sockets, a plurality of elongated teeth slidably disposed in said sockets with each socket having one tooth extending radially therefrom, said teeth being formed with axially offset portions, at least two teeth which are adjacent having their offset portions extending in opposite directions, and a ring element disposed around said hub member and between said adjacent teeth, said element engaging said offset portions of all the teeth and thus preventing radial movement thereof while permitting the teeth to flex circumferentially of the hub.

References Cited in the file of this patent

UNITED STATES PATENTS

| | | |
|---|---|---|
| 1,591,227 | Ness | July 6, 1926 |
| 2,560,359 | McCardell | July 10, 1951 |